March 31, 1970   P. BLIVEN   3,504,158
WELDING MATERIALS HAVING DIFFERENT CHARACTERISTICS
Filed Aug. 5, 1966

INVENTOR.
Paul Bliven

United States Patent Office 3,504,158
Patented Mar. 31, 1970

3,504,158
WELDING MATERIALS HAVING DIFFERENT CHARACTERISTICS
Paul Bliven, 344 Cayuga St., Salinas, Calif. 93901
Filed Aug. 5, 1966, Ser. No. 575,917
Int. Cl. B23k 9/00, 11/00, 11/16
U.S. Cl. 219—117
12 Claims

ABSTRACT OF THE DISCLOSURE

The present disclosure relates to apparatus and process for welding together two metals having different characteristics such as specific heats, conductivities, masses, or configurations; whereby each of the two requires an amount of heat different than the other to achieve their welding together. One of the two metals is moved along one leg and the other metal is moved along the other leg of a vee to meet and be welded together at the apex of such vee. Heating of the opposed surfaces of the metals prior to contact and welding at the apex is had by passing a high frequency current along each leg of the metal so that each current evidences the skin effect and between the current legs there is evidenced the proximity effect. The voltage of each current leg is different relative to the other to effect such differential heating of the two metals, one with respect to the other.

---

The present invention relates to the art of welding metals by means of high frequency currents and in particular to the problem of welding together materials having different characteristics such as dissimilar metals, different specific heats, different heat transfer rates, surface dissimilarities such as coatings and surface areas, and different configurations adjacent the areas to be welded together. While most of these differences obviously occur between dissimilar metals, many of them may occur between similar metals to be welded together. Any of these dissimilar characteristics occurring between materials to be joined together by welding, creates a problem that has not been capable of simple solution by the practices of the prior art, because the basic problem has been that of delivering, in a time period, more heat to one of such material's surfaces than to the other of such material's surfaces to be welded together. When a surface is referred to herein, reference is had to those portions of the material immediately adjacent to such surface and not to the abstract concept of a surface having only two dimensions.

In the prior art as exemplified by Dodson et al. 2,288,184, June 30, 1942 and by Rudd 2,821,619, Jan. 28, 1958 a single current circuit heats both of the surfaces to be joined together. Bennett 2,692,322, Oct. 19, 1954 uses a single field for inductively heating both surfaces. Rudd et al. 2,857,503, Oct. 21, 1958, referring to FIGURE 1, thereof, splits a single circuit into two legs with one of the legs heating one surface and the other leg heating the other surface. This later Rudd, also, controls the cross sectional distribution of this current in the material by the placement of magnetic materials along side of the current path. Peterson 3,004,136, Oct. 10, 1961 uses a separate generator and circuit for each surface to be heated.

The above art, nor any of the prior art known to applicant, does not disclose or teach, or disclose apparatus for, in the field of welding covered by such above art, how more heat is to be delivered to one of the surfaces to be welded than to the other surface.

Further, the above art does not teach or show how to easily adjust the amount of heat to one surface while maintaining constant the heat to the other weld surface.

Applicant has found that such needed differential heating of surfaces to be welded can be accomplished by the use of high frequency currents of different values, and he has found that such differential currents in and along such surfaces in accordance with the heating needs for the welding together of such surfaces can be easily and simply achieved by controlling the voltage of one of said currents independently of the other.

Thus it is an object of the present invention to weld together surfaces needing different heating by a process involving the use of high frequency currents of different values and exhibiting therebetween the proximity effect, and by achieving such value difference by controlling the applied voltage of one of said currents independently of the other.

Further, it is an object of the invention to achieve the above such differential heating by the use of a separate current source for each of said currents.

A further object of the invention is the laminating of thin sheets and the laminating of a thin sheet to a much thicker sheet or heavy plate, particularly, such materials to be welded together being different metals.

The above mentioned defects of the prior art are remedied and these objects achieved by the method of using a separate current circuit for each of the pieces to be welded together, each such piece being a part of a such individual circuit, and by the regulation of the voltage applied to a such piece with respect to the voltage applied to another of the pieces to be welded together so that differential heating of the pieces takes place to bring each of the pieces to its proper welding temperature at the same time. This invention also includes the mechanical arrangement of flowing a thin sheet of metal onto a plate of a different metal so that as the sheet and plate flow together there is formed between sheet and plate a wedge shaped zone; of heating the opposed surfaces of said sheet and plate in such zone by the just described method so that sheet and plate are welded together at and along the line of the apex of said zone.

A specific embodiment of the invention as outlined above is hereinafter described in detail and illustrated in the accompanying drawings, in which.

Figure 1:
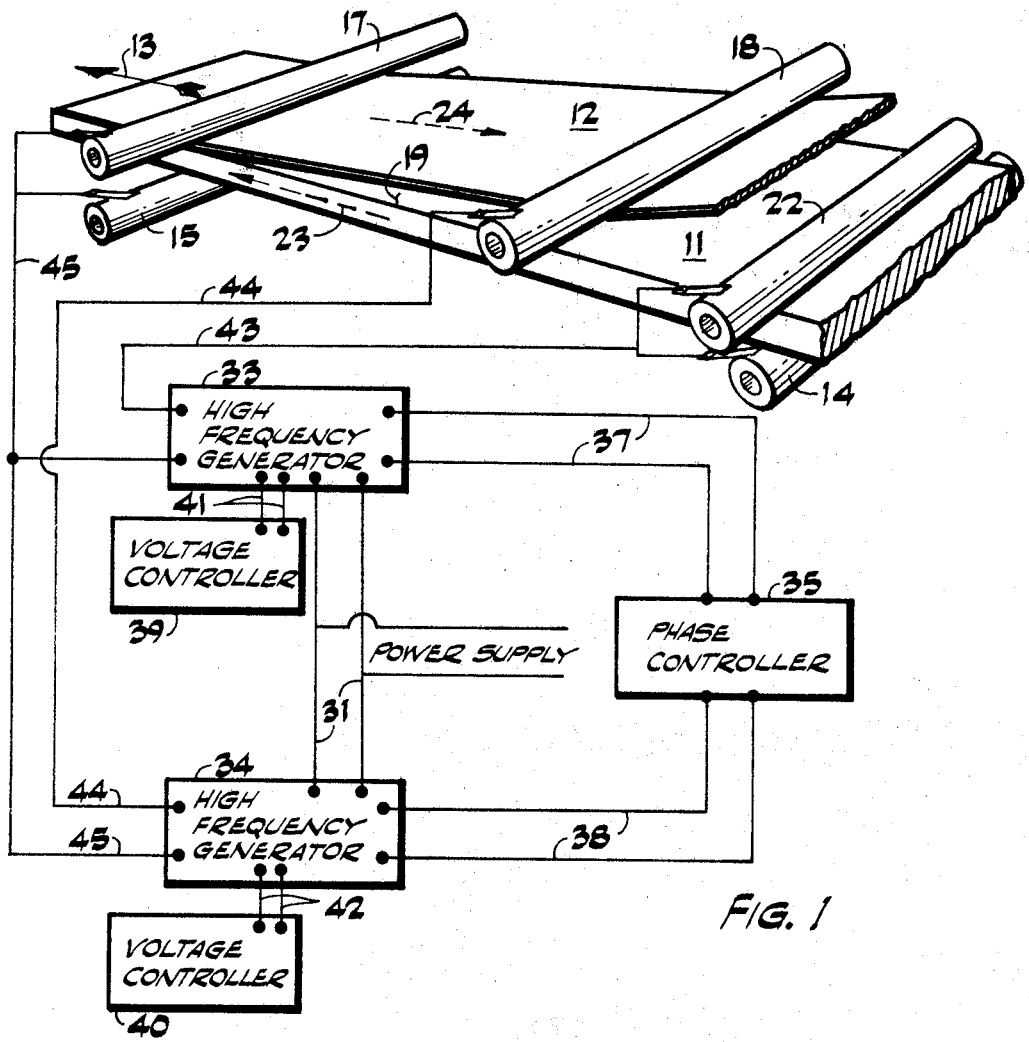
FIGURE 1 is a schematic showing of the present invention and includes a perspective view of the essential mechanical parts for one embodiment of the invention, and a diagram of the ancillary electrical circuits needed for such embodiment of the invention.

The disclosed embodiment involves the flowing onto and the welding to a metallic plate 11 of a thin metal sheet 12. Both plate 11 and sheet 12 are moving at the same speed and in registry, congruency, in the direction of the solid arrow 13. The plate and sheet may be of the same composition or different compositions such as the plate being of steel and the sheet being of copper. For the welding of some metals, it may be necessary for the welding zone to be filled with an inert gas to prevent the formation of oxides or, even, nitrides. The plate 12 is supported on an moves on a pair of spaced apart electrically conductive rollers 14, 15. The sheet 12 is pressed into contact with the plate by a pressure roller 17, also electrically conductive, placed above the plate and sheet in opposition to the plate support roller 15. Another roller 18, above and in contact with the sheet, also electrically conductive, is spaced from the pressure roller 17 opposite to the direction of travel of the sheet and is spaced from the plate so that at its line of contact with the sheet it will be spaced from the plate. The above locating of rollers 17, 18 provides a wedge shaped space 19 between the sheet and the plate as the plate and sheet approach and come into contact under the roller 17. This wedge shaped space 19 is the zone in which the opposed surfaces of the plate and sheet are heated to welding temperatures, and the welding takes place at the apex of the wedge space 19 when the sheet and plate are forced into contact by the pressure roller 17. A fourth electrically conductive roller 22 is placed above the plate and located in opposition to the first plate supporting roller 14 to firmly hold the plate therebetween. In most applications of the invention as illustrated, it is sufficient to drive only the plate support rollers 14, 15. The other rollers are idler rollers.

The under surface of the sheet 12 and upper surface of the plate 11 are in opposition, and these opposed surfaces in the wedge shaped heating zone 19 are heated by high frequency currents, one flowing in each of the two surfaces and in phase opposition as disclosed in Peterson, supra. Methods for the generation of a suitable high frequency current are well known in the electronic art and in the field of welding by means of such high frequency currents. Also, as disclosed in the prior art, these frequencies are between 100 and 500 kilocycles.

The present invention does not reside in any particular means or circuits for obtaining such a current or currents but in the regulation of such currents in particular ways in relationship to particular welding conditions. In the illustrated embodiment of the invention shown in FIGURE 1, the instantaneous phase relationship of the current in the sheet 12 with respect to the current in the plate 11 is diagramed by the dotted arrows 23, 24 being orientated in opposite directions, in 180° opposition. This condition is further illustrated in FIGURE 2 where the sine wave representation 23' of the current arrow 23 is 180° out of phase with the sine wave representation 24' of the current arrow 24. In this disclosure, any reference to positive or negative current terminals, or leads is a reference to instantaneous conditions and is not an indication of a steady condition.

Figure 2:
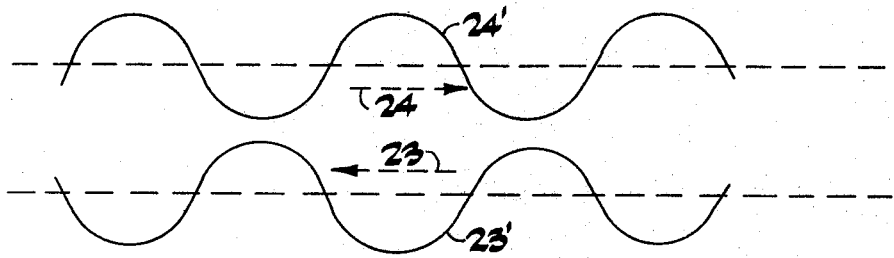
FIGURE 2 is a diagram of the phase relationship of the welding currents employed in the practice of the disclosed invention.

These currents are supplied to the materials being welded together by the circuits diagramed in FIGURE 1 and connected to portions of the above described mechanical parts as illustrated. Power from any suitable source comes into the electrical system by way of power leads 31 that feed in parallel to two separate high frequency generators 33, 34. The previously described phase relationship of the current outputs of the generators 33, 34 is regulated by a phase controller 35 having electrical connections 37, 38 to the generators. The voltage output of each generator is regulated by a voltage controller 39, 40 individual to each generator and each having electrical connections 41, 42 to each of the generators 33, 34. One generator, the one 33 for the plate 11, has one lead 43 connecting the generator 33 to the plate hold down roller 22 and its opposed plate support roller 14, located to the right of the heating zone 19. The other generator 34, the one for the sheet 12, has one lead 44 connecting the generator 34 to the sheet guide roller 18, also located to the right of the heating zone 19. Each of the generators has a connection to a common lead 45 to the sheet pressure roller 17 and its opposed plate support roller 15 that are to the left of the heating zone 19 and at the apex of the zone, the welding location under the pressure roller 17. This welding location under the pressure roller 17 and between the sheet and plate, extends along the roller the distance of contact between sheet and plate. That is, the plate and sheet need not be the same width.

With the above described association of mechanical and electrical parts functioning as indicated, sheet 12 and plate 11 will flow, or pass, from right to left into and form the wedge shaped heating zone 19, and into contact between the rollers 15, 17 at the line of welding; and the electrical system will cause current 24 to flow in the sheet 12 between the sheet rollers 17, 18, and current 23 in the plate between the plate rollers 22, 15 with the two currents 23, 24 in phase opposition to each other. It is this phase opposition of the high frequency currents that causes them to concentrate in the opposed surfaces of the sheet and plate to the practical exclusion of the other surface portions of the materials. This current concentration adjacent the opposed surfaces is greatest with 180° phase opposition and decreases as the phase opposition is varied from 180°. These currents will heat the opposed surfaces of the sheet and plate in the heating zone 19 with the heating and the proximity effect increasing as the materials approach the welding line.

It is to be observed that the showing of FIGURE 1 is of the welding of a sheet to a plate. This suggests that the sheet and plate differ in character at least to the extent of the respective masses involved. This, also suggests that the power requirement to bring the surface of the plate to welding temperature is greater than that required for the sheet if the two materials are of the same composition. In many instances in the past, no matter how desirable, it has not been possible with high frequency resistance welding involving the proximity effect to supply more heat to one of two pieces to be welded together than to the other piece. Applicant has found a simple solution for this probably unappreciated problem, he uses a separate current supply circuit for each of the to be welded together surfaces and then regulates the voltage in each circuit, or the division of voltage between the two circuits, so that each circuit gets the current needed to heat each of the pieces the required amount so that both of the opposed surfaces receive the required heat in the heating zone to bring both of them to their proper welding temperatures at the line of contact, the line of weld.

This is a simple solution of an old problem, a solution not found or suggested by the prior art. It is a solution that allows variation of the relative heating of the pieces as welding conditions vary in a continuous welding process as in the welding together of the edges of strips that vary in width. It allows the continuous lamination of a sheet to a base that varies in thickness. It is a solution that allows the lamination of a thin sheet to a heavy plate without overheating of the sheet. A thin sheet cannot be heated thru its entire thickness to a welding temperature because it loses its structural strength. It melts apart. The present process will allow the welding of very thin sheets such as aluminum foils to much heavier sheets or plates of different materials. The heating current required for a given material is governed by several factors such as mass, conductivity, both electrical and thermal, specific heat, radiation losses, welding temperature, time available for heating, etc. A table of the properties of the metals will show the wide range of values for such factors. Some metals will require twice as much heat as another.

Having thus described my invention and an embodiment thereof, and its construction and functioning, I claim:

1. The process of heating the surface of an electrically conductive first material by passing thru such material and along such surface a first high frequency current, and by passing a second high frequency current thru and along the surface of a second material, said surfaces being closely adjacent to each other so that said currents will therebetween exhibit the proximity effect and thereby said first current will concentrate along a surface portion of said first material to thereby heat such surface portion substantially to the exclusion of other portions of said first material, comprising: establishing a greater value for said first current as compared to said second current and independently of said second current to thereby heat said first material more than said second material.

2. The combination of claim 1 in which said current value difference is established by giving said currents, with respect to each other, different applied voltages.

3. The combination of claim 1 in which said materials differ in a characteristic.

4. The combination of claim 3 in which said materials differ in a composition characteristic.

5. The combination of claim 3 in which the masses of said materials to be heated adjacent said surface portions being heated differ with respect to each other.

6. The combination of claim 3 in which the characteristic difference between said materials is that of heat characteristic of the material to be heated adjacent said surface portions.

7. The combination of claim 3 in which one of said materials is in the form of a sheet having an extended width as compared with its thickness.

8. The combination of claim 7 in which the width of such sheet is at least ten times its thickness, resulting in such sheet being flexible.

9. The combination of claim 8 in which the other of said materials is rigid and much thicker than said sheet.

10. The combination of claim 7 in which said materials are flowed together in a continuous welding process involving a wedge shaped heating zone with welding occurring at the apex of said zone.

11. The combination of claim 3 in which the characteristic difference is that of the amount of heat required in a given time to simultaneously bring said surface portions to a desired condition for welding together such portions, and welding together such portions.

12. The combination of claim 11 in which said current difference is established by giving said currents, with respect to each other, different applied voltages.

References Cited

UNITED STATES PATENTS

| | | | |
|---|---|---|---|
| 2,821,619 | 1/1958 | Rudd | 219—107 |
| 3,004,136 | 10/1961 | Peterson | 219—67 |
| 3,265,854 | 8/1966 | Bliven | 219—117 |
| 3,359,402 | 12/1967 | Rieppel | 219—117 |

JOSEPH V. TRUHE, Primary Examiner

HUGH D. JAEGER, Assistant Examiner

U.S. Cl. X.R.

219—118